(12) United States Patent
Deng et al.

(10) Patent No.: US 12,395,753 B2
(45) Date of Patent: Aug. 19, 2025

(54) IMAGE SENSOR AND IMAGE OUTPUT METHOD THEREOF, AND OPTOELECTRONIC DEVICE

(71) Applicant: Shenzhen Ruishizhixin Technology Co., Ltd., Guangdong (CN)

(72) Inventors: Jian Deng, Guangdong (CN); Yingyun Zha, Guangdong (CN)

(73) Assignee: SHENZHEN RUISHIZHIXIN TECHNOLOGY CO., LTD., Shenzhen (CN)

(*) Notice: Subject to any disclaimer, the term of this patent is extended or adjusted under 35 U.S.C. 154(b) by 136 days.

(21) Appl. No.: 18/379,676

(22) Filed: Oct. 13, 2023

(65) Prior Publication Data

US 2024/0323572 A1 Sep. 26, 2024

Related U.S. Application Data

(63) Continuation of application No. PCT/CN2023/097298, filed on May 31, 2023.

(30) Foreign Application Priority Data

Mar. 22, 2023 (CN) .......................... 202310285432.0

(51) Int. Cl.
*H04N 25/571* (2023.01)
*H04N 25/53* (2023.01)
(Continued)

(52) U.S. Cl.
CPC .......... *H04N 25/573* (2023.01); *H04N 25/53* (2023.01); *H04N 25/57* (2023.01); *H04N 25/59* (2023.01);
(Continued)

(58) Field of Classification Search
CPC .......... H04N 25/53; H04N 25/57–575; H04N 25/59; H04N 25/703; H04N 25/709; H04N 25/78
See application file for complete search history.

(56) References Cited

U.S. PATENT DOCUMENTS

2003/0234344 A1* 12/2003 Lai ........................ H04N 25/573
348/E3.021
2009/0039236 A1* 2/2009 Yang ...................... H10F 39/803
250/208.1
(Continued)

FOREIGN PATENT DOCUMENTS

WO WO-2023174653 A1 * 9/2023 ............. H04N 25/47

*Primary Examiner* — Lin Ye
*Assistant Examiner* — Chriss S Yoder, III
(74) *Attorney, Agent, or Firm* — PV IP PC; Wei Te Chung

(57) ABSTRACT

Provided are an image sensor and an image output method thereof, and an optoelectronic device. The image sensor includes a plurality of pixels, which include a photoelectric detection circuit, a signal readout circuit, a floating diffusion node, an integrating capacitor, a transmission circuit, an adaptive power supply, and a signal processing circuit. The floating diffusion node integrates the photoelectric charge into the integrating capacitor to obtain an integral voltage. The signal processing circuit generates a logarithmic voltage and a logarithmic current. After the floating diffusion node receives the photoelectric charge, the target voltage is much less than the reference voltage. The node current is the photocurrent, and the node voltage is the integral voltage. When the target voltage increases to the reference voltage, the node current is the logarithmic current, and the node voltage is the logarithmic voltage, so the signal readout circuit finally outputs the corresponding image signals.

14 Claims, 3 Drawing Sheets

(51) Int. Cl.
*H04N 25/57* (2023.01)
*H04N 25/59* (2023.01)
*H04N 25/703* (2023.01)
*H04N 25/709* (2023.01)
*H04N 25/78* (2023.01)

(52) U.S. Cl.
CPC ......... *H04N 25/703* (2023.01); *H04N 25/709* (2023.01); *H04N 25/78* (2023.01)

(56) References Cited

U.S. PATENT DOCUMENTS

| | | | | |
|---|---|---|---|---|
| 2010/0224765 A1* | 9/2010 | Seitz | ...................... | H04N 3/155 250/214.1 |
| 2022/0109799 A1* | 4/2022 | Niwa | ................... | H04N 25/443 |

\* cited by examiner

IMAGE SENSOR AND IMAGE OUTPUT METHOD THEREOF, AND OPTOELECTRONIC DEVICE

CROSS-REFERENCE TO RELATED APPLICATIONS

This application is a continuation of International Application No. PCT/CN2023/097298, filed May 31, 2023, which is based upon and claims priority to Chinese Patent Application No. 202310285432.0, filed Mar. 22, 2023, the entire contents of which are incorporated herein by reference.

TECHNICAL FIELD

The present application relates to the field of photosensitive elements, in particular to an image sensor and an image output method thereof, and an optoelectronic device.

BACKGROUND

Image sensors can convert the light signals incident on its photosensitive surface into corresponding electrical signals through photoelectric conversion, and output the corresponding images based on these converted electrical signals. The image sensors are widely applied in diverse optoelectronic devices, such as digital cameras, camcorders, video recorders, fax machines, image scanners, and digital televisions. However, in the related art, the image sensors tend to exhibit limited operating forms in adapting to dynamic environments, particularly when confronted with fluctuations between low and high light scenarios, which significantly impacts the imaging quality of the image sensors.

Therefore, it is necessary to improve the structure of image sensors in the related art.

SUMMARY

The present application provides an image sensor and an image output method thereof, and an optoelectronic device, which aims to solve the problem that the operating forms of the image sensors in the related art are limited.

In order to solve the technical problem in the related art, in the first aspect, embodiments of the present application provide an image sensor comprising a pixel array comprising a plurality of pixels, wherein the plurality of pixels comprise a floating diffusion node, an integrating capacitor, a photoelectric detection circuit, a signal readout circuit, an adaptive power supply, a transmission circuit, and a signal processing circuit; wherein the photoelectric detection circuit is connected to the floating diffusion node through the transmission circuit, and the floating diffusion node is grounded through the integrating capacitor; the floating diffusion node and the integral capacitor are both connected to the signal readout circuit, and the adaptive power supply is connected to the floating diffusion node through the signal processing circuit. Specifically, the photoelectric detection circuit is configured to perform a photoelectrical conversion on an incident light to obtain a corresponding photoelectric charge; the transmission circuit is configured to transmit the photoelectric charge to the floating diffusion node; the signal processing circuit is configured to generate a logarithmic voltage and a logarithmic current (the logarithmic voltage and the logarithmic current are in a logarithmic relationship); the floating diffusion node is configured to integrate the photoelectric charge into the integrating capacitor to obtain a corresponding integral voltage; after the floating diffusion node receives the photoelectric charge, a difference between a target voltage (referring to the adaptive voltage of the adaptive power supply minus the node voltage of the floating diffusion node) and the reference voltage is greater than a preset threshold value, and the logarithmic current is less than the photocurrent corresponding to the photoelectric charge, so that a node current of the floating diffusion node is the photocurrent corresponding to the photoelectric charge, and a node voltage of the floating diffusion node is the integral voltage; a target voltage is equal to an adaptive voltage of the adaptive power supply minus the node voltage; the target voltage increases with time, and when the target voltage increases to a level at which the difference between the target voltage and the reference voltage is less than or equal to the preset threshold value, the logarithmic current is greater than the photocurrent corresponding to the photoelectric charge, and the logarithmic current flows into the floating diffusion node, so that the node current is the logarithmic current and the node voltage is the logarithmic voltage; and the signal readout circuit is configured to output a corresponding image signal according to the node voltage.

In the second aspect, the embodiments of the present application provide an image output method, applied to an image sensor, the image sensor comprising a pixel array comprising a plurality of pixels, wherein the plurality of pixels comprise a floating diffusion node, an integrating capacitor, a photoelectric detection circuit, a signal readout circuit, an adaptive power supply, a transmission circuit, and a signal processing circuit; wherein the photoelectric detection circuit is connected to the floating diffusion node through the transmission circuit, and the floating diffusion node is grounded through the integrating capacitor; the floating diffusion node and the integral capacitor are both connected to the signal readout circuit, and the adaptive power supply is connected to the floating diffusion node through the signal processing circuit. Specifically, the image output method comprises: performing, by the photoelectric detection circuit, a photoelectrical conversion on an incident light to obtain a corresponding photoelectric charge; transmitting, by the transmission circuit, the photoelectric charge to the floating diffusion node; generating, by the signal processing circuit, a logarithmic voltage and a logarithmic current (the logarithmic voltage and the logarithmic current are in a logarithmic relationship); integrating, by the signal processing circuit, the photoelectric charge into the integrating capacitor to obtain a corresponding integral voltage; after the floating diffusion node receives the photoelectric charge, a difference between a target voltage (referring to the adaptive voltage of the adaptive power supply minus the node voltage of the floating diffusion node) and the reference voltage is greater than a preset threshold value, and the logarithmic current is less than the photocurrent corresponding to the photoelectric charge, so that a node current of the floating diffusion node is the photocurrent corresponding to the photoelectric charge, and a node voltage of the floating diffusion node is the integral voltage; the target voltage is equal to an adaptive voltage of the adaptive power supply minus the node voltage; the target voltage increases with time, and when the target voltage increases to a level at which the difference between the target voltage and the reference voltage is less than or equal to the preset threshold value, the logarithmic current is greater than the photocurrent corresponding to the photoelectric charge, and the logarithmic current flows into the floating diffusion node, so that the node current is the logarithmic current and the node voltage is the logarithmic voltage; and outputting, by the signal readout circuit, a corresponding image signal according to the node voltage.

In the third aspect, embodiments of the present application provide an image sensor in embodiments of the present application in the first aspect.

As can be seen from the above description, the beneficial effect of the present application is as follows. The image sensor includes a pixel array including a plurality of pixels. The plurality of pixels comprise a floating diffusion node, an integrating capacitor, a photoelectric detection circuit, a signal readout circuit, an adaptive power supply, a transmission circuit, and a signal processing circuit. In practical applications, the photoelectric detection circuit performs a photoelectrical conversion on an incident light to obtain a corresponding photoelectric charge. The transmission circuit transmits the photoelectric charge to the floating diffusion node. After receiving the photoelectric charge, the floating diffusion node integrates the photoelectric charge into the integrating capacitor to obtain the corresponding integral voltage. Besides, the signal processing circuit generates a logarithmic voltage and a logarithmic current in a logarithmic relationship. After the floating diffusion node receives the photoelectric charge, a difference between the target voltage and the reference voltage is greater than a preset threshold value, indicating that the target voltage is much less than the reference voltage, and the logarithmic current is less than the photocurrent corresponding to the photoelectric charge. That is, the logarithmic current does not flow into the floating diffusion node, so that a node current of the floating diffusion node is the photocurrent corresponding to the photoelectric charge, and a node voltage is the integral voltage. The target voltage increases with time, and when the target voltage increases to a level at which the difference between the target voltage and the reference voltage is less than or equal to the preset threshold value, the logarithmic current increases to be larger than the photocurrent corresponding to the photoelectric charge. That is, the logarithmic current flows into the floating diffusion node, so that the node current of the floating diffusion node is the logarithmic current, and the node voltage is the logarithmic voltage. Ultimately, the corresponding image signal is outputted by the signal readout circuit according to the node voltage (the integral voltage or the logarithmic voltage). It can be seen from this process that; the image sensor of the present application has two different types of operating forms rather than one type of operating form. The two different operating forms are respectively an integral form (i.e., the node voltage is an integral voltage, and the signal readout circuit outputs the corresponding image signal according to the integral voltage) and a logarithmic form (i.e., the node voltage is a logarithmic voltage, and the signal readout circuit outputs the corresponding image signal according to the logarithmic voltage), which enables the image sensor to adapt well to changing environments and thus improves the imaging quality of the image sensor. The environment where there is a fluctuation between low and high light scenarios is taken as an example herein. When the floating diffusion node receives the photoelectric charge, the light intensity of the incident light is still in a weak state, and the target voltage is much less than the reference voltage. The image sensor operates in the integral form, and its dark light sensitivity is also enhanced by the integration of the photoelectric charge, thus improving a signal-to-noise ratio of the image sensor in the low-light environment and ensuring a low-noise characteristic. It can be concluded that, in the environment where there is a fluctuation between low and high light scenarios, the image sensor of the embodiment of the present application can still take into account the low noise of the image sensor under a low-light environment and a high dynamic range under a high-light environment by the multiple operating forms of the image sensor, thereby enabling the image sensor to obtain an image of better quality at all times.

BRIEF DESCRIPTION OF THE DRAWINGS

In order to illustrate the technical solutions in the related art or the embodiments of the present application more clearly, the accompanying drawings to be used in the description of the related art or the embodiments will be briefly described below. Obviously, the accompanying drawings in the following description are some embodiments of the present application, for a person having ordinary skill in the art, other accompanying drawings can be obtained without creative work.

DETAILED DESCRIPTION OF THE EMBODIMENTS

In order to make the objects, technical solutions, and advantages of the present application more obvious and understandable, the present application will be described clearly and completely bellows in conjunction with the embodiments of the present application and the corresponding accompanying drawings. The same or similar labels from the beginning to the end denote the same or similar elements or elements having the same or similar functions. It should be understood that the various embodiments of the present application described below are only for explaining the present application, and are not intended to limit the present application. That is, based on the various embodiments of the present application, all other embodiments obtained by a person of ordinary skill in the art without making creative labor fall within the protection scope of the present application. Furthermore, the technical features involved in the various embodiments of the present application described below may be combined with each other as long as they do not constitute a conflict with each other.

An image sensor is an element configured to convert incident light on its own light-sensitive surface into a corresponding electrical signal, which generally includes a Complementary Metal Oxide Semiconductor (CMOS) image sensor and a Dynamic Vision Sensor (DVS). The CMOS image sensor is known as Active Pixel Sensor (APS) and the DVS is known as Event-based Vision Sensor (EVS). In the related art, the image sensor exhibits limited operating forms in adapting to dynamic environments, particularly when confronted with fluctuations between low and high light scenarios, which significantly impacts the overall imaging quality of the image sensor. Therefore, embodiments of the present application provide an image sensor that can be applied to an optoelectronic device. The optoelectronic device is a device that needs to convert incident light into a corresponding electrical signal, such as a digital camera, a camera, a video recorder, a facsimile machine, an image scanner, and a digital television.

Figure 1:
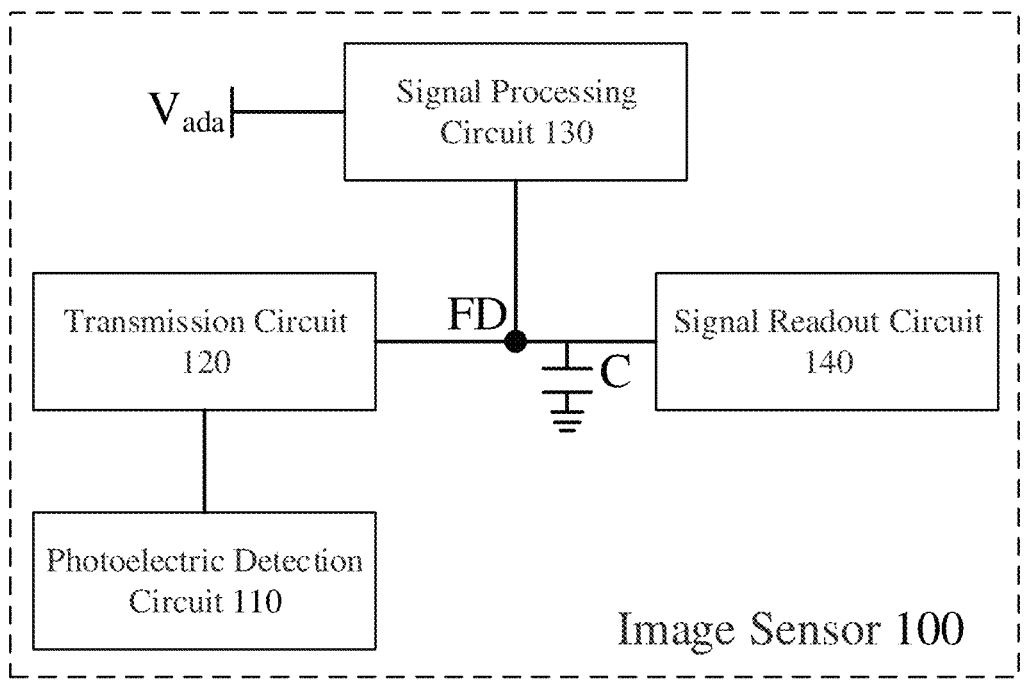
FIG. 1 shows a block diagram of a first kind of module of a pixel in an image sensor according to an embodiment of the present application.

FIG. 1 shows a block diagram of a first kind of module of a pixel in an image sensor according to an embodiment of the present application. In some embodiments, the image sensor 100 includes a pixel array including a plurality of pixels. The pixels include a floating diffusion node FD, an integrating capacitor C, a photoelectric detection circuit 110, a signal readout circuit 140, an adaptive power supply $V_{ada}$, a transmission circuit 120, and a signal processing circuit 130. The photoelectric detection circuit 110 is connected to the floating diffusion node FD through the transmission circuit 120. The floating diffusion node FD is grounded through the integrating capacitor C. The floating diffusion node FD and the integrating capacitor C are both connected to the signal readout circuit 140, and the adaptive power supply $V_{ada}$ is connected to the floating diffusion node FD through the signal processing circuit 130. In this paper, an adaptive voltage of the adaptive power supply $V_{ada}$ minus a node voltage of the floating diffusion node FD is defined as a target voltage.

In practical applications, the photoelectric detection circuit 110 performs a photoelectrical conversion on the incident light to obtain the corresponding photocurrent and integrates the obtained photocurrent to obtain the corresponding photoelectric charge. The transmission circuit 120 transmits the photoelectric charge accumulated by the photoelectric detection circuit 110 to the floating diffusion node FD. After receiving the photoelectric charge, the floating diffusion node FD integrates the photoelectric charge into the integrating capacitor C (which is equivalent to discharging the floating diffusion node FD by the integrating capacitor C), thereby obtaining the corresponding integral voltage. Besides, the signal processing circuit 130 generates the logarithmic voltage and the logarithmic current in a logarithmic relationship. After the floating diffusion node FD receives the photoelectric charge, a difference between the target voltage and the reference voltage is greater than a preset threshold value, indicating that the target voltage is much less than the reference voltage, and the logarithmic current is less than the photocurrent corresponding to the photoelectric charge. That is, the logarithmic current does not flow into the floating diffusion node FD, so that a node current of the floating diffusion node FD is the photocurrent corresponding to the photoelectric charge, and a node voltage is the integral voltage. The target voltage increases with time, and when the target voltage increases to a level at which the difference between the target voltage and the reference voltage is less than or equal to the preset threshold value, the logarithmic current increases to be larger than the photocurrent corresponding to the photoelectric charge. That is, the logarithmic current flows into the floating diffusion node FD, so that the node current of the floating diffusion node FD is the logarithmic current, and the node voltage is the logarithmic voltage. Ultimately, the corresponding image signal is outputted by the signal readout circuit 140 according to the node voltage (i.e., the integral voltage or the logarithmic voltage). It can be seen from this process that, the image sensor of this embodiment of the present application has two different types of operating forms rather than one type of operating form. The two different operating forms are respectively an integral form (i.e., the node voltage is an integral voltage, and the signal readout circuit 140 outputs the corresponding image signal according to the integral voltage) and a logarithmic form (i.e., the node voltage is a logarithmic voltage, and the signal readout circuit 140 outputs the corresponding image signal according to the logarithmic voltage), which enables the image sensor to adapt well to changing environments and thus improves the imaging quality of the image sensor.

The environment where there is a fluctuation between low and high light scenarios is taken as an example herein. When the floating diffusion node FD receives the photoelectric charge, the light intensity of the incident light is still in a weak state, and the target voltage is much less than the reference voltage, so that the image sensor operates in the integral form, and its dark light sensitivity is also enhanced by the integration of the photoelectric charge, thus improving a signal-to-noise ratio of the image sensor in the low-light environment, and ensuring a low-noise characteristic. Afterward, the light intensity of the incident light gradually increases with time, which makes the target voltage also gradually increases. When the light intensity of the incident light increases to a stronger state, the target voltage is very close to the reference voltage. At this time, the operating form of the image sensor is the logarithmic form, and the logarithmic voltage in the logarithmic form extends the voltage that can be generated by the full trap charge of the photoelectric detection circuit 110, thereby extending the dynamic range of the image sensor in the high-light environments. It can be concluded that, in the environment where there is a fluctuation between low and high light scenarios, the image sensor of the embodiment of the present application can still take into account the low noise of the image sensor under a low-light environment and a high dynamic range under a high-light environment by the multiple operating forms of the image sensor, thereby enabling the image sensor to obtain an image of better quality at all times.

Figure 2:
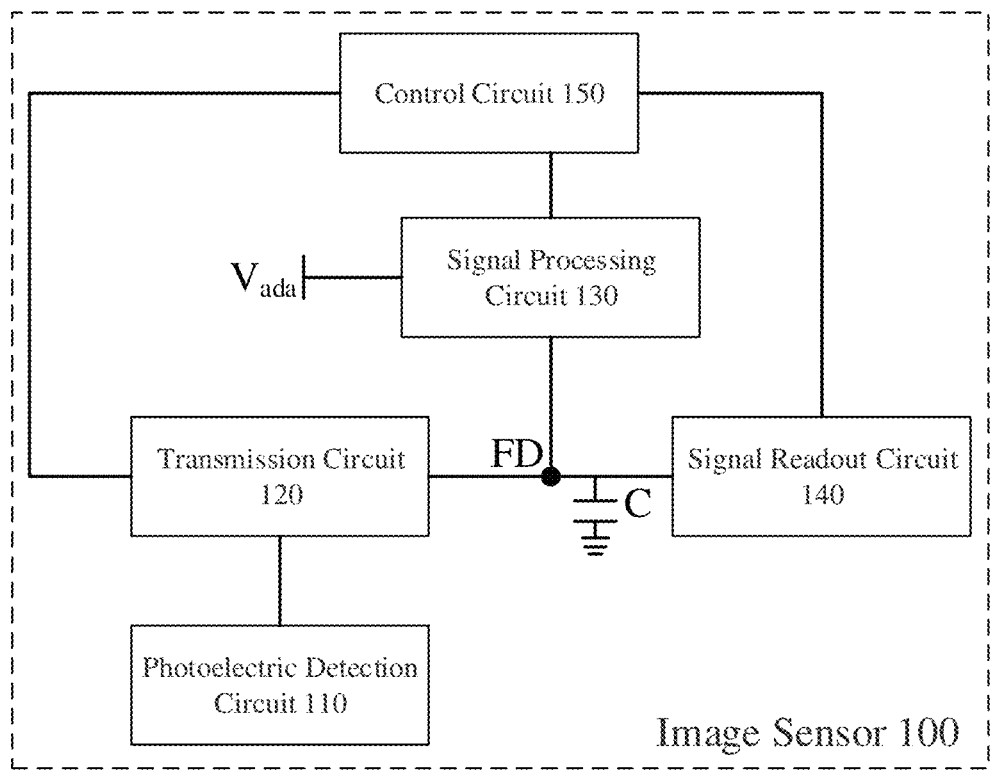
FIG. 2 shows a block diagram of a second kind of module of the pixel in the image sensor according to an embodiment of the present application.

Further, referring to the second module block diagram of the pixel in the image sensor according to the embodiment of the present application shown in FIG. 2, in addition to the floating diffusion node FD, the integrating capacitor C, the photoelectric detection circuit 110, the signal readout circuit 140, the transmission circuit 120, the adaptive power supply $V_{ada}$, and the signal processing circuit 130, the pixel further includes a control circuit 150, which is connected to the transmission circuit 120, the signal processing circuit 130, and the signal readout circuit 140, and is configured to control the transmission circuit 120, the signal processing circuit 130, and the signal readout circuit 140, mainly controlling the operating state of each electronic component in each of the circuits, and, generate a corresponding image according to the image signal output from the signal readout circuit 140.

Figure 3:
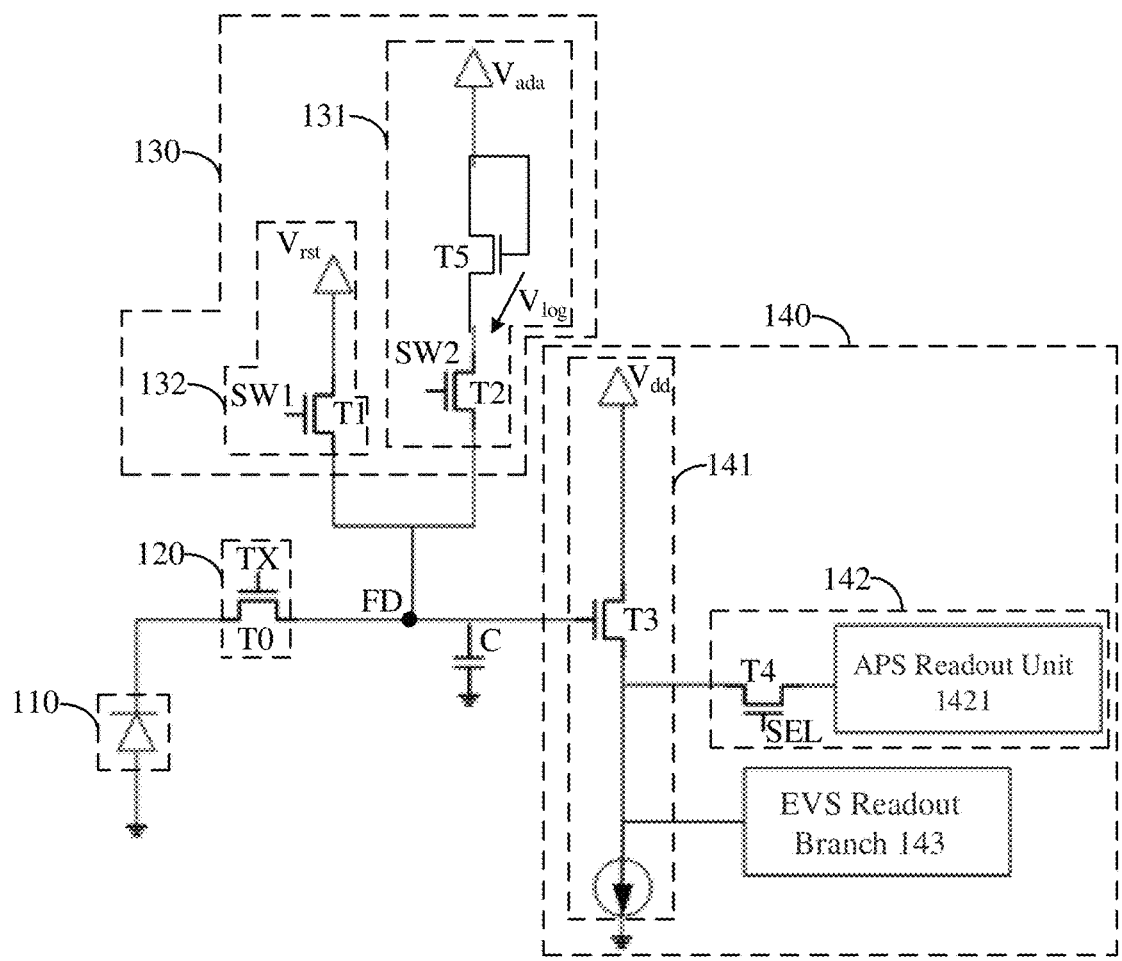
FIG. 3 shows a schematic structural diagram of a circuit of the pixel in the image sensor according to an embodiment of the present application.

As one of the embodiments, please refer to the schematic diagram of a circuit structure of the pixel in the image sensor according to an embodiment of the present application shown in FIG. 3, the transmission circuit 120 includes a transmission transistor TO. A first end of the transmission transistor TO is connected to the photoelectric detection circuit 110, a second end of the transmission transistor TO is connected to the control circuit 150, and a third end of the transmission transistor TO is connected to the floating diffusion node FD. In practice, the transmission transistor TO may be turned on or off under the control of the control circuit 150 according to timing requirements, and the floating diffusion node FD receives the photoelectric charge accumulated by the photoelectric detection circuit 110 transmitted through the transmission transistor TO only when the transmission transistor TO is turned on.

As one of the embodiments, still referring to FIG. 3, the signal processing circuit 130 includes a reset branch 132 and a logarithmic branch 131. The reset branch 132 and the logarithmic branch 131 are both connected to the floating diffusion node FD, and the reset branch 132 and the logarithmic branch 131 are both connected to the control circuit 150. The adaptive power supply $V_{ada}$ is connected to the floating diffusion node FD through the logarithmic branch 131. In practical applications, before the floating diffusion node FD receives the photoelectric charge accumulated by the photoelectric detection circuit 110, the reset branch 132 can reset the node voltage of the floating diffusion node FD under the control of the control circuit 150. After the reset work of the reset branch 132 is completed, the floating diffusion node FD can receive the photoelectric charge from the photoelectric detection circuit 110 through the transmission circuit 120. After the floating diffusion node FD receives the photoelectric charge, the logarithmic branch 131 can generate a logarithmic current and a logarithmic voltage in a logarithmic relationship, and the logarithmic voltage increases with time, while the magnitude of the logarithmic current is positively correlated with the magnitude of the logarithmic voltage. In this embodiment, after the floating diffusion node FD receives the photoelectric charge accumulated by the photoelectric detection circuit 110, the logarithmic current is less than the photocurrent corresponding to the photoelectric charge (equivalent to the target voltage is much less than the reference voltage). In such a case, the logarithmic current does not flow into the floating diffusion node FD. That is, the node current of the floating diffusion node FD is the photocurrent corresponding to the photoelectric charge, and the node voltage is the integral voltage, so that the signal reading out circuit 140 outputs the corresponding integral voltage according to the integral voltage, and the pixel operates in the integral form. The logarithmic voltage increases continuously with the increase of time. Since the size of the logarithmic current is positively correlated with the size of the logarithmic voltage, the logarithmic current also increases continuously. When the logarithmic current increases to a level greater than the photocurrent corresponding to the photoelectric charge (i.e., the target voltage is close to the reference voltage), the logarithmic current flows into the floating diffusion node FD, so that the node current of the floating diffusion node FD is a logarithmic current and the node voltage is a logarithmic voltage. The signal readout circuit 140 outputs the corresponding image signal according to the logarithmic voltage, and the pixel operates in the logarithmic form.

In some embodiments of the present embodiment, still referring to FIG. 3, the logarithmic branch circuit 131 includes a reset transistor T5 and a first switching transistor T2. A gate and a drain of the reset transistor T5 are connected to the adaptive power supply $V_{ada}$, and a source of the reset transistor T5 is connected to a drain of the first switching transistor T2. A gate of the first switching transistor T2 is connected to the control circuit 150, and a source of the first switching transistor T2 is connected to the floating diffusion node FD. In practical applications, the first switching transistor T2 may be in an on state under the control of the control circuit 150 when the floating diffusion node FD receives the photoelectric charge accumulated by the photoelectric detection circuit 110, i.e., after the reset work of the reset branch 132 on the floating diffusion node FD is completed. The reset transistor T5 may generate a logarithmic current and a logarithmic voltage in a logarithmic relationship after the floating diffusion node FD receives the photoelectric charge accumulated by the photoelectric detection circuit. In these embodiments, there is a logarithmic relationship between a drain-source voltage and a drain-source current of the reset transistor T5. The logarithmic current is the drain-source current, the logarithmic voltage is the drain-source voltage, and the reference voltage is the threshold voltage of the reset transistor T5.

In some embodiments of the present embodiment, still referring to FIG. 3, the reset branch circuit 132 includes a reset power supply Vrst and a second switching transistor T1. A drain of the second switching transistor T1 is connected to the reset power supply Vrst, a gate of the second switching transistor T1 is connected to the control circuit 150, and a source of the second switching transistor T1 is connected to the floating diffusion node FD. In practical applications, before the floating diffusion node FD receives the photoelectric charge accumulated by the photoelectric detection circuit 110, the second switching transistor T1 may be in an on state under the control of the control circuit 150. Only when the second switching transistor T1 is in the on state, the reset power supply Vrst may reset the node voltage of the floating diffusion node FD to its own voltage.

In this embodiment, after the floating diffusion node FD receives the photoelectric charge accumulated by the photoelectric detection circuit 110, the difference between the target voltage and the reference voltage is greater than a preset threshold value at first, i.e., the target voltage is much less than the reference voltage at first. At this time, the logarithmic current is less than the photocurrent corresponding to the photoelectric charge, i.e., the logarithmic current does not flow into the floating diffusion node FD, so that the node current of the floating diffusion node FD is the photocurrent corresponding to the photoelectric charge, the node voltage is the integral voltage. The signal readout circuit 140 outputs the corresponding image signal according to the integral voltage, and the image sensor is in the integral form. Then, the target voltage gradually increases with the passage of time, and when the target voltage increases to a level at which the difference between the target voltage and the reference voltage is less than or equal to the preset threshold value, that is, the target voltage is no longer far less than the reference voltage but close to the reference voltage, the logarithmic current increases to be greater than the photocurrent corresponding to the photoelectric charge. That is, the logarithmic current flows into the floating diffusion node FD, so that the node current of the floating diffusion node FD is the logarithmic current, and the node voltage is the logarithmic voltage. The signal readout circuit 140 outputs the corresponding image signals according to the logarithmic voltage, and the image sensor is in the logarithmic form. It is understood that since the target voltage is equal to the adaptive voltage of the adaptive power supply $V_{ada}$ minus the node voltage of the floating diffusion node FD, the image sensor can be set to adaptively convert between the integral form and the logarithmic form by reasonably setting the voltage of the adaptive power supply $V_{ada}$ in this embodiment, so as to be able to better adapt to the changeable environment and to improve the imaging quality of the image sensor. The setting of the voltage of the adaptive power supply $V_{ada}$ determines the conversion between the integral form and the logarithmic form of the image sensor, which preferably takes into account the effective voltage conversion of the full trap charge of the photoelectric detection circuit 110 as well as the turning on of the photocurrent detection. For an environment where there is a fluctuation between low and high light scenarios, the setting thereof should satisfy both the low noise characteristics under the low-light environment and the high dynamic range under the high-light environment.

Figure 4:
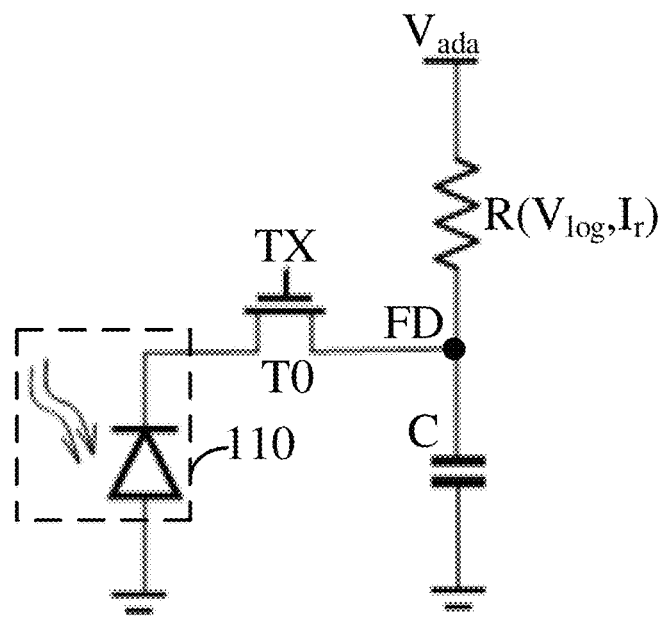
FIG. 4 shows an equivalent circuit diagram of a floating diffusion node according to an embodiment of the present application.

For a clearer understanding of this adaptive principle in this embodiment, please refer to an equivalent circuit diagram of the floating diffusion node according to the embodiment of the present application shown in FIG. 4. The reset transistor T5 is replaced by an equivalent nonlinear resistance R, which may be described by $I_r=I_S*exp(V_{log}/nU_T)$. $I_r$ indicates a current flowing through the equivalent nonlinear resistance R. $V_{log}$ indicates a drain-source voltage (i.e., logarithmic voltage) of the reset transistor T5. n is a rational number greater than 0, and both $U_T$ and $I_S$ indicate a constant, when the floating diffusion node FD receives the photoelectric charge accumulated by the photoelectric detection circuit 110, $V_{log}$ is relatively small. In this case, the resistance value of the equivalent nonlinear resistor R is very large, and the resistance value of the equivalent nonlinear resistor R decreases drastically with the increase of $V_{log}$. In other words, $V_{FD}$ (the node voltage of the floating diffusion node FD) is precharged to Vet (the voltage of the reset power supply $V_{rst}$). After the conduction of the transmission transistor T0, when $V_{ada}-V_{FD}$ (i.e., the target voltage, and $V_{ada}$ indicates the voltage of the adaptive power supply $V_{ada}$) is much less than $V_T$ (the threshold voltage of the reset transistor T5, i.e., the reference voltage), the integration capacitance C presents a linear discharge, and the pixel operates in the integral form. Afterward, with the increase of time, when $V_{ada}-V_{FD}$ is close to VT, the situation that the drain voltage of the reset transistor T5 overrides the previous integral voltage (i.e., the logarithmic current flows into the floating diffusion node FD, which makes the node voltage of the floating diffusion node FD to be a logarithmic voltage. In such a situation, the output is no longer outputted with the integral voltage). In this case, the corresponding image signal is no longer output with the integral voltage, but with the logarithmic voltage), the pixel operates in the logarithmic form, and the final value of the $V_{FD}$ is determined by a voltage drop across the equivalent non-linear resistor R.

Figure 5:
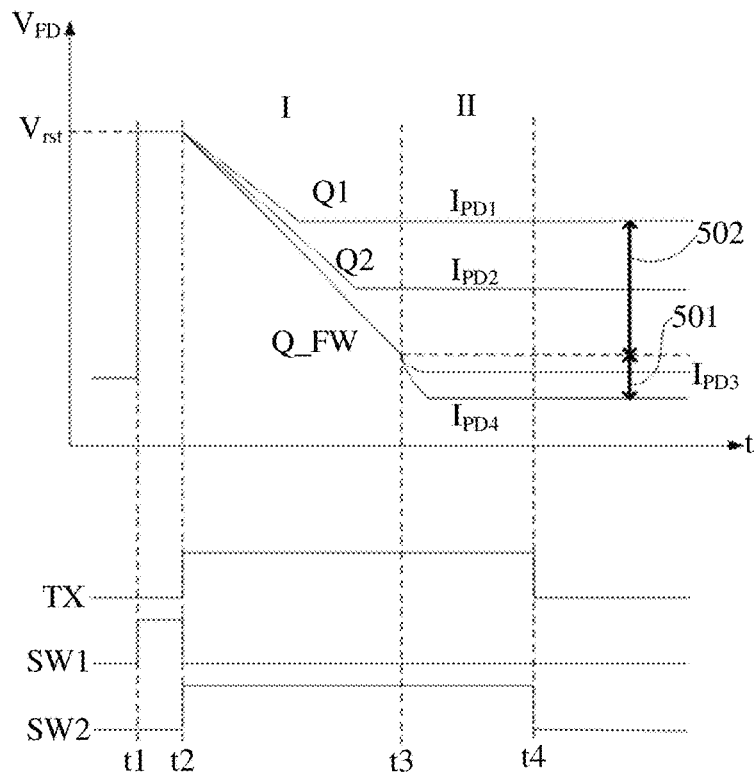
FIG. 5 shows a timing diagram of the image sensor according to an embodiment of the present application.

Further, referring to the timing diagram of the image sensor illustrated in FIG. 5, at t1 moment, the control circuit 150 controls the transmission transistor T0 to be off by the control signal TX, controls the second switching transistor T1 to be on by the control signal SW1, and controls the first switching transistor T2 to be off by the control signal SW2, causing the node voltage of the floating diffusion node FD to be reset to $V_{rst}$. At t2 moment, the control circuit 150 controls the second switching transistor T1 to be off by the control signal SW1, controls the first switching transistor T2 to be on by the control signal SW2, and controls the transmission transistor T0 to be on by the control signal TX. At this time, the node voltage of the floating diffusion node FD is determined by the integral voltage. That is, in region I, $V_{ada}-V_{FD}$ is very small or even negative, and the equivalent nonlinear resistance R of the reset transistor T5 is very large, so that the circuit presents an approximate linear discharge mode, and the pixel operates in the integral form. In region II, Vlog gradually increases, the equivalent nonlinear resistance R of the reset transistor T5 gradually becomes smaller, and the node voltage of the floating diffusion node FD is not only determined by the discharge of the integrating capacitor C but also determined by the logarithmic relationship between the drain-source voltage of the reset transistor T5 and drain-source current. At this time, the pixel operates in a logarithmic form, and the pixel can be considered as an APS pixel with a high dynamic range or as a front-end circuit of the EVS. The node voltage is related only to the magnitude of the current photocurrent and not to the accumulation of the photocurrent by the photoelectric detection circuit 110 during the exposure time, i.e., it is not related to the integral voltage. In FIG. 5, $I_{PD}$ represents the light intensity of the incident light (i.e., the magnitude of the incident photocurrent). $I_{PD1}$ is greater than $I_{PD2}$, $I_{PD2}$ is greater than $I_{PD3}$, and $I_{PD3}$ is greater than $I_{PD4}$. Q1, Q2, and Q_FW all represent charges, and further Q_FW represents a full-well charge of the photoelectric detection circuit 110. The magnitude of the incident photocurrent can be used to characterize the brightness of the environment. When the environment varies greatly in brightness and darkness, the image sensor of the embodiments of the present application can make a clear distinction between them (e.g., 501, 502 in FIG. 5). When the environment varies slightly in brightness and darkness, the image sensor of the embodiments of the present application also can make a distinction between them, so as to make the image sensor respond to the darkness of the ambient environment in the integral form, and respond to the lightness of the ambient environment in the logarithm form.

As one of the embodiments, still referring to FIG. 3, the signal readout circuit 140 includes an APS readout branch 142, an EVS readout branch 143, and a drive branch 141. The APS readout branch 142 and the EVS readout branch 143 are connected to the floating diffusion node FD through the drive branch 141, and the APS readout branch 142 and the EVS readout branch 143 are connected to the control circuit 150. In practical applications, the drive branch 141 buffers a potential of the floating diffusion node FD for the purpose to output the node voltage to the APS readout branch 142 and the EVS readout branch 143. Afterward, the APS readout branch 142 can output a corresponding grayscale signal according to the node voltage from the drive branch 141, while the EVS readout branch 143 can output a corresponding event signal according to the difference between the node voltage from the drive branch 141 and the preset voltage, in this case, the difference between the node voltage and the preset voltage is used to indicate a change in the intensity of the incident light (i.e., increase, decrease, or remain unchanged). For example, the change in the intensity of the incident light is determined by determining whether or not the difference between the node voltage and the preset voltage is greater than 0, whether or not the difference is less than 0, or whether or not the difference is equal to 0. This is the basis for obtaining the event signal.

In some implementations of this embodiment, the drive branch 141 includes a drive transistor T3 and a drive power supply $V_{dd}$. A gate of the drive transistor T3 is connected to the floating diffusion node FD, a drain is connected to the drive power supply $V_{dd}$, and a source of the drive transistor T3 is connected to the APS readout branch 142 and the EVS readout branch 143. The drive transistor T3 is equivalent to a source following amplifier, which can buffer the potential of the floating diffusion node FD so as to output the node voltage to the APS readout branch 142 and the EVS readout branch 143. In some implementations of this embodiment, the APS readout branch 142 includes a selecting transistor T4 and an APS readout unit 1421. A drain of the selecting transistor T4 is connected to the drive branch 141, a gate of the selecting transistor T4 is connected to the control circuit 150, and a source of the selecting transistor T4 is connected to the APS readout unit 1421. The APS readout unit 1421 is connected to the control circuit 150. In practical applications, the selecting transistor T4 can receive the node voltage output from the drive branch circuit 141, as well as turn on or off according to the timing requirements under the control of the control circuit 150. Only when the selecting transistor T4 is on, the APS readout unit 1421 receives the node voltage transmitted through the selecting transistor T4. Afterward, the APS readout unit 1421 can output the corresponding grayscale signal according to the received node voltage.

In this embodiment, the signal readout circuit 140 has the function of reading out both the APS signal and the EVS signal, in which case the image sensor can output both the APS image and the EVS image. However, in other embodiments, the signal readout circuit 140 may also be equipped with the function of outputting only one type of image signal, such as outputting only the APS signal or the EVS signal. When the signal readout circuit 140 is equipped with the function of outputting only the APS signal, it only includes the drive branch 141 and the APS readout branch 142. In this case, the working process of the drive branch 141 and the APS readout branch 142 is consistent with that described in the previous section. When the signal readout circuit 140 only has the function of outputting the EVS signal, it only includes the drive branch 141 and the EVS readout branch 143. In this case, the working process of the drive branch 141 and the EVS readout branch 143 is consistent with that described in the previous section, which will not be repeated here.

The above embodiments are only preferred embodiments of the present application, and they are not the only limitation of the described content. In this regard, a person of ordinary skill in the art may flexibly set according to the actual application scenario based on the above embodiments. In addition, it should be noted that the photoelectric detection circuit 110 may include, but is not limited to, a photodiode, a phototransistor, a clamped photodiode, or other similar devices common in the field that can achieve photoelectric conversion. In the above embodiment, the photoelectric detection circuit 110, the control circuit 150, the APS readout branch 142, and the EVS readout branch 143 may be provided in a manner as follows. Each of them is provided in each pixel in the pixel array, or only one is provided so that they are shared by all pixels in the pixel array, or a plurality of them are provided so that they are shared by all pixels in the same array unit in the pixel array. The pixel array may be divided into a plurality of array units, and each array unit includes a predetermined number of pixels. Exemplarily, each column of pixels in the pixel array constitutes an array unit; or, each row of pixels in the pixel array constitutes an array unit. As for the exposure method of the image sensor 100, it may adopt a global exposure or a roll-up exposure. Under different exposure methods, the timing of on/off of each transistor in the pixels is different, which may be specifically set according to the actual requirements, which will not be further elaborated herein.

Figure 6:
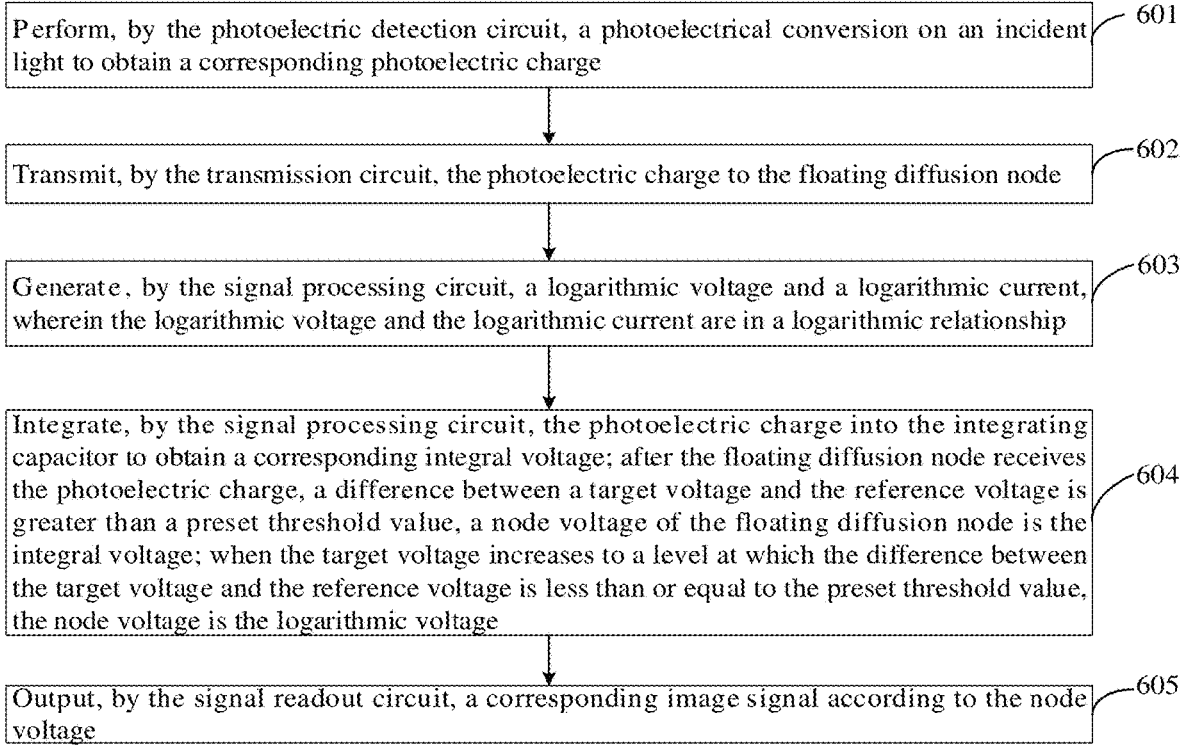
FIG. 6 shows a flowchart of an image output method according to an embodiment of the present application.

FIG. 6 is a flowchart of an image output method according to an embodiment of the present application. This image output method is implemented based on an image sensor 100 provided by an embodiment of the present application. In some embodiments, the image output method includes the following steps. Step 601, the photoelectric detection circuit 110 performs a photoelectrical conversion on the incident light to obtain a corresponding photoelectric charge. Step 602, the transmission circuit 120 transmits the photoelectric charge to a floating diffusion node FD. Step 603, the signal processing circuit 130 generates a logarithmic voltage and a logarithmic current in a logarithmic relationship. Step 604, the floating diffusion node FD integrates the photoelectric charge into the integrating capacitor C to obtain the corresponding integral voltage. After the floating diffusion node FD receives the photoelectric charge, a difference between the target voltage (i.e., the adaptive voltage of the adaptive power supply $V_{ada}$ minus the node voltage of the floating diffusion node FD) and the reference voltage is greater than a preset threshold value, the logarithmic current is less than the photocurrent corresponding to the photoelectric charge, so that the node current of the floating diffusion node FD is the photocurrent corresponding to the photoelectric charge, and the node voltage of the floating diffusion node FD is the integral voltage. The target voltage increases with time, and when the target voltage increases to a level at which the difference between the target voltage and the reference voltage is less than or equal to the preset threshold value, the logarithmic current is greater than the photocurrent and flows into the floating diffusion node FD, so that the node current of the floating diffusion node FD is the logarithmic current, and the node voltage is the logarithmic voltage. Step 605: the signal readout circuit 140 outputs the corresponding image signal according to the node voltage of the floating diffusion node FD. It should be noted that for the unexhausted points in the description of the image output method, it is sufficient to refer to the relevant contents of the image sensor 100 shown previously, and the embodiments of the present application will not be repeated herein.

In summary, the embodiments of the present application provide an image sensor and an image output method thereof. The image sensor has two different operating forms, namely, an integral form and a logarithmic form. In the embodiments of the present application, the image sensor may adaptively convert between the integral form and the logarithmic form by reasonably setting the voltage of the adaptive power supply $V_{ada}$, thereby better adapting to the changing environment, and improving the imaging quality of the image sensor. For variable environments, such as environments where there is a fluctuation between low and high light, the embodiments of the present application can take into account the integral characteristics of the APS and the current and voltage intrinsic characteristics of the EVS front-end circuit through the multiple operating forms of the image sensor, and be able to accurately output the node voltages from small photocurrents to large photocurrents, thus taking into account the low noise in low-light environments and the high dynamic range of high light environments, and ultimately improving the imaging quality of the image sensor.

The steps of the method or algorithm described in connection with the embodiments disclosed herein may be implemented directly in hardware, in a software module executed by a processor, or in a combination of both. The software module may be placed in random memory (RAM), memory, read-only memory (ROM), electrically programmable ROM, electrically erasable programmable ROM, register, hard drive, removable disks, CD-ROM, or any other form of storage medium known in the art.

The above embodiments may be implemented in whole or in part by software, hardware, firmware, or any combination thereof. When implemented in software, they may be implemented in whole or in part in the form of a computer program product. The computer program product includes one or more computer instructions. When the computer program instructions are loaded and executed on a computer, the processes or functions are produced in whole or in part, in accordance with the present application. The computer may be a general-purpose computer, a special-purpose computer, a computer network, or other programmable devices. The computer instructions may be stored in a computer-readable storage medium or transmitted from one computer-readable storage medium to another computer-readable storage medium, e.g., the computer instructions may be transmitted by wired (e.g., coaxial cable, fiber optic, digital subscriber line) or wireless (e.g., infrared, wireless, microwave, etc.) means from one site, computer, server, or data center to another site, computer, server, or data center for transmission. The computer-readable storage medium may be any usable medium to which a computer has access, or a data storage device that contains one or more usable media integrated, such as a server, a data center, etc. The available media may be magnetic media (such as floppy disk, hard disk, tape), optical media (such as DVD), or semiconductor media (such as Solid State Disk).

It should be noted that each embodiment in the present application is described progressively, and each embodiment focuses on the differences with other embodiments, and it is sufficient to refer to each embodiment for the same and similar parts of each embodiment with each other. For the product embodiments, since it is similar to the method embodiments, the description is relatively simple, the relevant part of the method embodiments may be referred to the part of the description.

It should also be noted that, in the present application, relationship terms such as first and second are used only to distinguish one entity or operation from another, and do not necessarily require or imply any such actual relationship or order between the entities or operations. Furthermore, the terms "include", "comprise" or any other variant thereof are intended to cover non-exclusive inclusion, so that a process, method, item, or equipment comprising a set of elements includes not only those elements, but also other elements not expressly listed, or elements inherent to such process, method, item, or equipment. Or it also includes elements that are inherent to such process, method, item or apparatus. Without further limitation, an element is defined by the phrase "includes a . . . " does not preclude the existence of another identical element in the process, method, item, or apparatus that includes the element.

The above description of the disclosed embodiments enables a person skilled in the art to realize or use the contents of the present application. Various modifications to these embodiments are apparent to those skilled in the art, and the general principles defined in the contents of the present application may be implemented in other embodiments without departing from the spirit or scope of the contents of the present application. Therefore, the present application contents will not be limited to these embodiments shown in the contents of the present application, but will be subject to the widest scope consistent with the principles and novel features disclosed in the contents of the present application.

What is claimed is:

1. An image sensor comprising a pixel array comprising a plurality of pixels, wherein the plurality of pixels comprise a floating diffusion node, an integrating capacitor, a photoelectric detection circuit, a signal readout circuit, an adaptive power supply, a transmission circuit, and a signal processing circuit; wherein the photoelectric detection circuit is connected to the floating diffusion node through the transmission circuit, and the floating diffusion node is grounded through the integrating capacitor; the floating diffusion node and the integral capacitor are both connected to the signal readout circuit, and the adaptive power supply is connected to the floating diffusion node through the signal processing circuit;

the photoelectric detection circuit is configured to perform a photoelectrical conversion on an incident light to obtain a corresponding photoelectric charge;

the transmission circuit is configured to transmit the photoelectric charge to the floating diffusion node;

the signal processing circuit is configured to generate a logarithmic voltage and a logarithmic current, wherein the logarithmic voltage and the logarithmic current are in a logarithmic relationship;

the floating diffusion node is configured to integrate the photoelectric charge into the integrating capacitor to obtain a corresponding integral voltage; after the floating diffusion node receives the photoelectric charge, a difference between a target voltage and the reference voltage is greater than a preset threshold value, and the logarithmic current is less than the photocurrent corresponding to the photoelectric charge, so that a node current of the floating diffusion node is the photocurrent corresponding to the photoelectric charge, a node voltage of the floating diffusion node is the integral voltage, and the target voltage is equal to an adaptive voltage of the adaptive power supply minus the node voltage; the target voltage increases with time, and when the target voltage increases to a level at which the difference between the target voltage and the reference voltage is less than or equal to the preset threshold value, the logarithmic current is greater than the photocurrent corresponding to the photoelectric charge, and the logarithmic current flows into the floating diffusion node, so that the node current is the logarithmic current and the node voltage is the logarithmic voltage; and the signal readout circuit is configured to output a corresponding image signal according to the node voltage.

2. The image sensor of claim 1, wherein the plurality of pixels further comprises a control circuit, wherein the control circuit is connected to the transmission circuit, the signal processing circuit, and the signal readout circuit; the control circuit is configured to control the transmission circuit, the signal processing circuit, and the signal readout circuit, and generate a corresponding image according to the image signal.

3. The image sensor of claim 2, wherein the signal processing circuit comprises a reset branch and a logarithmic branch, wherein the reset branch and the logarithmic branch are both connected to the floating diffusion node; the reset branch and the logarithmic branch are both connected to the control circuit, and the adaptive power supply is connected to the floating diffusion node through the logarithmic branch;

the reset branch is configured to reset the node voltage under a control of the control circuit before the floating diffusion node receives the photoelectric charge;

the logarithmic branch circuit is configured to generate the logarithmic voltage and the logarithmic current after the floating diffusion node receives the photoelectric charge; wherein the logarithmic voltage increases with time, and a magnitude of the logarithmic current is positively related to a magnitude of the logarithmic voltage; after the floating diffusion node receives the photoelectric charge, the logarithmic current is less than the photocurrent corresponding to the photoelectric charge; with the increase of time, when the logarithmic current increases to be greater than the photocurrent corresponding to the photoelectric charge, the logarithmic current flows into the floating diffusion node, so that that the node current is the logarithmic current and the node voltage is the logarithmic voltage.

4. The image sensor of claim 3, wherein the logarithmic branch comprises a reset transistor and a first switching transistor, wherein a gate and a drain of the reset transistor are both connected to the adaptive power supply; a source of the reset transistor is connected to a drain of the first switching transistor; a gate of the first switching transistor is connected to the control circuit; a source of the first switching transistor is connected to the floating diffusion node;

the first switching transistor is configured to be in an on state under the control of the control circuit when the floating diffusion node receives the photoelectric charge;

the reset transistor is configured to generate the logarithmic voltage and the logarithmic current after the floating diffusion node receives the photoelectric charge; wherein there is a logarithmic relationship between a drain-source voltage and a drain-source current of the reset transistor; the logarithmic voltage is the drain-source voltage; the logarithmic current is the drain-source current, and the reference voltage is equal to a threshold voltage of the reset transistor.

5. The image sensor of claim 3, wherein the reset branch comprises a reset power supply and a second switching transistor, wherein a drain of the second switching transistor is connected to the reset power supply; a gate of the second switching transistor is connected to the control circuit, and a source of the second switching transistor is connected to the floating diffusion node;

the second switching transistor is configured to be in an on state under the control of the control circuit before the floating diffusion node receives the photoelectric charge;

the reset power supply is configured to reset the node voltage to a voltage of the reset power supply when the second switching transistor is in the on state.

6. The image sensor of claim 2, wherein the signal readout circuit comprises a drive branch and an Event-based Vision Sensor (EVS) readout branch, wherein the EVS readout branch is connected to the floating diffusion node through the drive branch, and the EVS readout branch is connected to the control circuit;

the drive branch is configured to buffer a potential of the floating diffusion node to output the node voltage to the EVS readout branch;

the EVS readout branch is configured to output a corresponding event signal according to the difference between the node voltage and a predetermined voltage.

7. The image sensor of claim 2, wherein the signal readout circuit comprises a drive branch and an Active Pixel Sensor (APS) readout branch, wherein the APS readout branch is connected to the floating diffusion node via the drive branch, and the APS readout branch is connected to the control circuit;

the drive branch is configured to buffer a potential of the floating diffusion node to output the node voltage to the APS readout branch;

the APS readout branch is configured to output a corresponding grayscale signal according to the node voltage.

8. The image sensor of claim 7, wherein the APS readout branch comprises a selecting transistor and an APS readout unit, wherein a drain of the selecting transistor is connected to the drive branch; a gate of the selecting transistor is connected to the control circuit; a source of the selecting transistor is connected to the APS readout unit, and the APS readout unit is connected to the control circuit;

the selecting transistor is configured to receive the node voltage output from the drive branch, and turn on or turn off under the control of the control circuit based on timing requirements; when the selecting transistor is on, the APS readout unit receives the node voltage transmitted through the selecting transistor;

the APS readout unit is configured to output a corresponding grayscale signal according to the node voltage.

9. The image sensor of claim 2, wherein the signal readout circuit comprises a drive branch, an Active Pixel Sensor (APS) readout branch, and an Event-based Vision Sensor (EVS) readout branch, wherein the APS readout branch and the EVS readout branch are connected to the floating diffusion node via the drive branch, and the APS readout branch and the EVS readout branch are both connected to the control circuit;

the drive branch is configured to buffer a potential of the floating diffusion node to output the node voltage to the APS readout branch and the EVS readout branch;

the APS readout branch is configured to output a corresponding grayscale signal according to the node voltage;

the EVS readout branch is configured to output a corresponding event signal according to a difference between the node voltage and a preset voltage.

10. The image sensor of claim 9, wherein the drive branch comprises a drive transistor and a drive power supply, wherein a gate of the drive transistor is connected to the floating diffusion node; a drain of the drive transistor is connected to the drive power supply; a source of the drive transistor is connected to the APS readout branch and the EVS readout branch; the drive transistor is configured to buffer the potential of the floating diffusion node to output the node voltage.

11. The image sensor of claim 9, wherein the APS readout branch comprises a selecting transistor and an APS readout unit, wherein a drain of the selecting transistor is connected to the drive branch; a gate of the selecting transistor is connected to the control circuit; a source of the selecting transistor is connected to the APS readout unit, and the APS readout unit is connected to the control circuit;

the selecting transistor is configured to receive the node voltage output from the drive branch, and turn on or turn off under the control of the control circuit based on timing requirements; when the selecting transistor is on, the APS readout unit receives the node voltage transmitted through the selecting transistor;

the APS readout unit is configured to output a corresponding grayscale signal according to the node voltage.

12. The image sensor of claim 2, wherein the transmission circuit comprises a transmission transistor, wherein a first end of the transmission transistor is connected to the photoelectric detection circuit, a second end of the transmission transistor is connected to the control circuit, and a third end of the transmission transistor is connected to the floating diffusion node; the transmission transistor is configured to be on or off under the control of the control circuit according to timing requirements; when the transmission transistor is on, the floating diffusion node receives the photoelectric charge transmitted by the transmission transistor.

13. An optoelectronic device, comprising an image sensor of claim 1.

14. An image output method applied to an image sensor, the image sensor comprising a pixel array comprising a plurality of pixels, wherein the plurality of pixels comprise a floating diffusion node, an integrating capacitor, a photoelectric detection circuit, a signal readout circuit, an adaptive power supply, a transmission circuit, and a signal processing circuit; wherein the photoelectric detection circuit is connected to the floating diffusion node through the transmission circuit, and the floating diffusion node is grounded through the integrating capacitor; the floating diffusion node and the integral capacitor are both connected to the signal readout circuit, and the adaptive power supply is connected to the floating diffusion node through the signal processing circuit; the image output method comprising:

performing, by the photoelectric detection circuit, a photoelectrical conversion on an incident light to obtain a corresponding photoelectric charge;

transmitting, by the transmission circuit, the photoelectric charge to the floating diffusion node;

generating, by the signal processing circuit, a logarithmic voltage and a logarithmic current, wherein the logarithmic voltage and the logarithmic current are in a logarithmic relationship;

integrating, by the signal processing circuit, the photoelectric charge into the integrating capacitor to obtain a corresponding integral voltage; after the floating diffusion node receives the photoelectric charge, a difference between a target voltage and the reference voltage is greater than a preset threshold value, and the logarithmic current is less than the photocurrent corresponding to the photoelectric charge, so that a node current of the floating diffusion node is the photocurrent corresponding to the photoelectric charge, and a node voltage of the floating diffusion node is the integral voltage; the target voltage is equal to an adaptive voltage of the adaptive power supply minus the node voltage; the target voltage increases with time, and when the target voltage increases to a level at which the difference between the target voltage and the reference voltage is less than or equal to the preset threshold value, the logarithmic current is greater than the photocurrent corresponding to the photoelectric charge, and the logarithmic current flows into the floating diffusion node, so that the node current is the logarithmic current and the node voltage is the logarithmic voltage; and outputting, by the signal readout circuit, a corresponding image signal according to the node voltage.

* * * * *